(12) United States Patent
Meyer

(10) Patent No.: US 8,691,359 B1
(45) Date of Patent: Apr. 8, 2014

(54) VEHICLE CD PLAYER PLUG-COVER

(76) Inventor: Marian Meyer, Whitewater, CO (US)

( * ) Notice: Subject to any disclaimer, the term of this patent is extended or adjusted under 35 U.S.C. 154(b) by 183 days.

(21) Appl. No.: 13/234,489

(22) Filed: Sep. 16, 2011

(51) Int. Cl.
*B32B 7/06* (2006.01)
*B32B 7/08* (2006.01)

(52) U.S. Cl.
USPC ............................. 428/99; 428/120; 455/345

(58) Field of Classification Search
USPC ................ 428/99, 120, 31; 455/345
See application file for complete search history.

(56) References Cited

U.S. PATENT DOCUMENTS

| | | | |
|---|---|---|---|
| 4,365,280 A * | 12/1982 | Crosetti et al. | ............... 360/137 |
| 2002/0009916 A1 | 1/2002 | Lord | |
| 2007/0015486 A1 | 1/2007 | Marlowe | |
| 2007/0230099 A1 | 10/2007 | Turner et al. | |
| 2010/0149748 A1 | 6/2010 | Lam | |
| 2010/0324705 A1 | 12/2010 | Vandiver | |

* cited by examiner

*Primary Examiner* — Alexander Thomas

(57) ABSTRACT

A vehicle CD player plug-cover that includes a parallelepiped cover having a parallelepiped insert projecting perpendicularly from a rear surface, which insert releasably inserts into an automobile CD player to conceal the CD player from view.

3 Claims, 4 Drawing Sheets

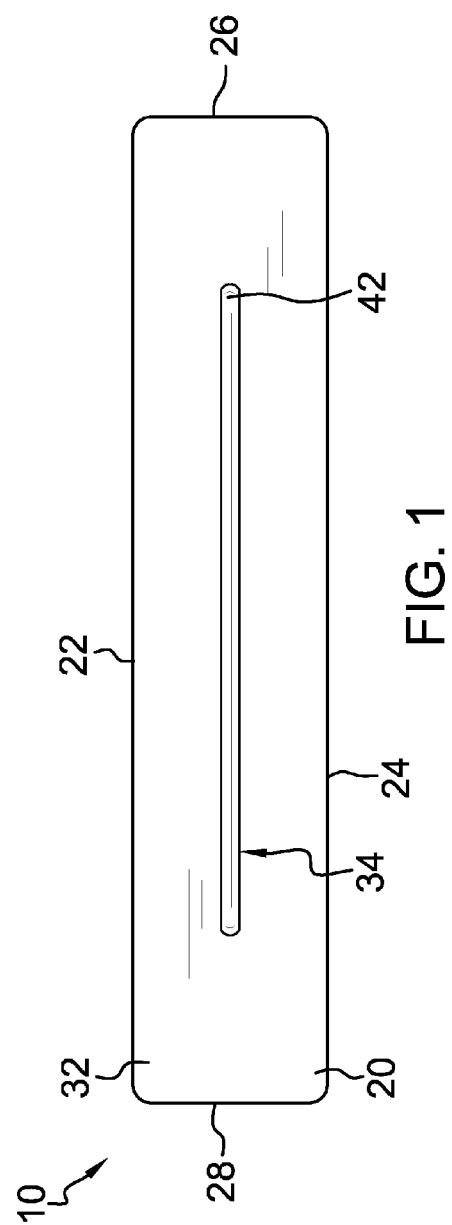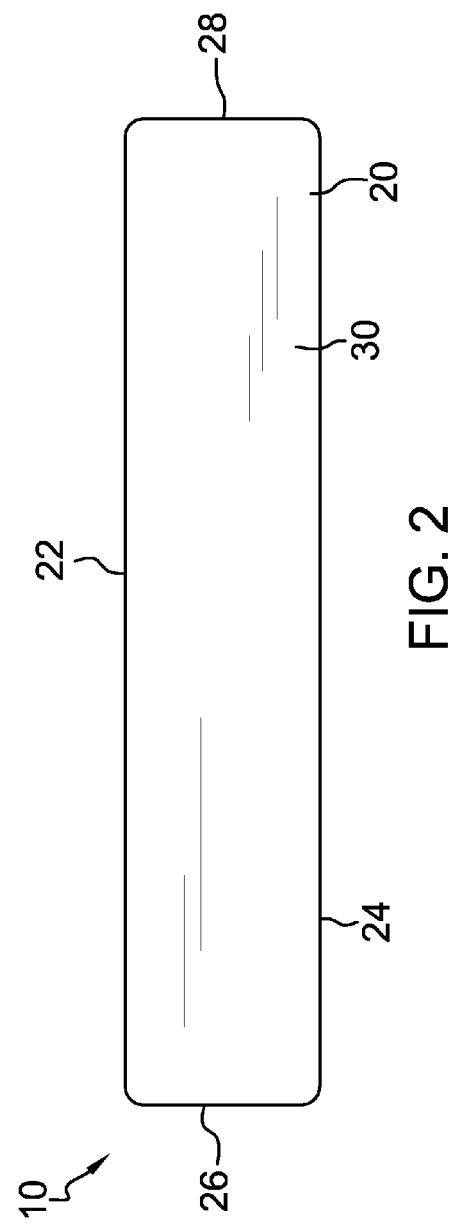

VEHICLE CD PLAYER PLUG-COVER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Figure 3:
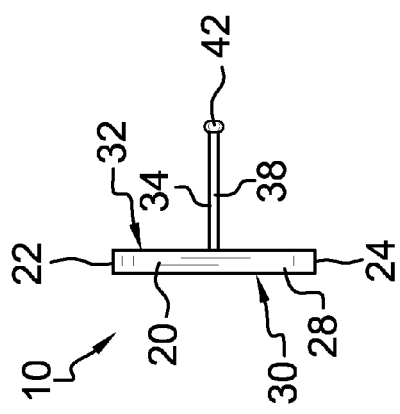

Various types of vehicle Vehicle CD player plug-covers are known in the prior art. However, what is needed is a vehicle CD player plug-cover that includes a parallelepiped cover having a parallelepiped insert projecting perpendicularly from a rear surface, which insert releasably inserts into an automobile CD player to conceal the CD player from view.

FIELD OF THE INVENTION

The present invention relates to a vehicle CD player plug-cover, and more particularly, to a vehicle CD player plug-cover that includes a parallelepiped cover having a parallelepiped insert projecting perpendicularly from a rear surface, which insert releasably inserts into an automobile CD player to conceal the CD player from view.

SUMMARY OF THE INVENTION

The general purpose of the vehicle CD player plug-cover, described subsequently in greater detail, is to provide a vehicle CD player plug-cover which has many novel features that result in a vehicle CD player plug-cover which is not anticipated, rendered obvious, suggested, or even implied by prior art, either alone or in combination thereof.

The present vehicle CD player plug-cover has been devised to releasably insert into an automobile CD player and conceal the CD player from view. When concealed, an automobile CD player is less likely to attract thieves. The present vehicle CD player plug-cover, by concealing a CD player which may have bright lights disposed thereon and other inharmonious lines and design elements, further presents an aesthetically pleasing exterior less distracting to a driver. A further intent of the present vehicle CD player plug-cover is to protect a CD player, from dust and debris, and other damage that may result when the CD player is left uncovered.

The present vehicle CD player plug-cover includes a parallelepiped cover configured to cover an automobile CD player. This cover has a front surface and a rear surface. A parallelepiped insert projects perpendicularly from the rear surface. This insert has a bead disposed along a rear edge, the bead configured to have the same length as the diameter of a standard CD. The bead therefore inserts into a CD player in the same manner as a CD, and the insert holds the cover over the CD player exterior thereby concealing the CD player from view.

The insert may be ejected, and the vehicle CD player plug-cover removed from the CD player, in the same manner as ejecting a CD.

The present vehicle CD player plug-cover may have designs on the front surface to make the vehicle CD player plug-cover more aesthetically pleasing to the owner and match an interior of an automobile, as desired.

Thus has been broadly outlined the more important features of the present vehicle CD player plug-cover so that the detailed description thereof that follows may be better understood and in order that the present contribution to the art may be better appreciated.

Objects of the present vehicle CD player plug-cover, along with various novel features that characterize the invention are particularly pointed out in the claims forming a part of this disclosure. For better understanding of the vehicle CD player plug-cover, its operating advantages and specific objects attained by its uses, refer to the accompanying drawings and description.

BRIEF DESCRIPTION OF THE DRAWINGS FIGURES

Figure 4:
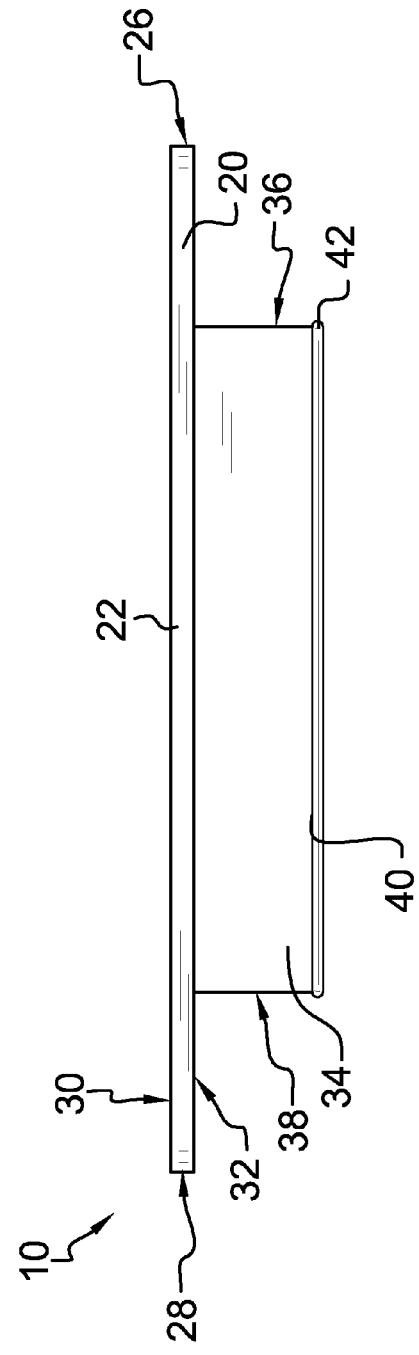
Figure 5:
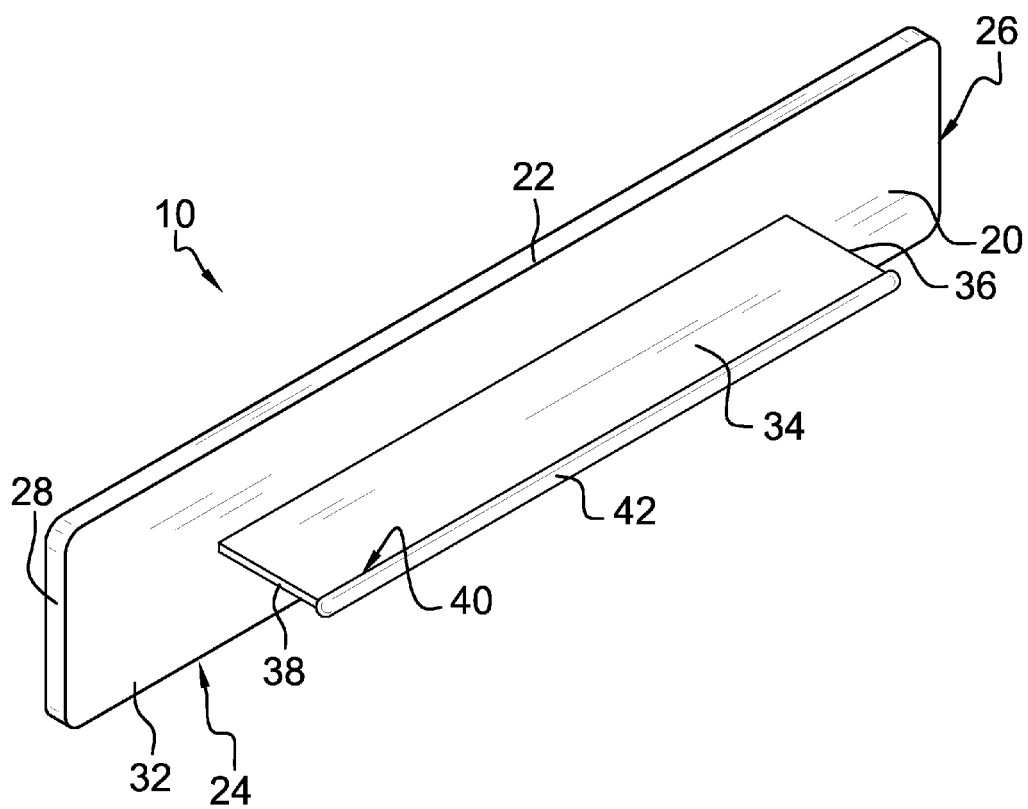
Figure 6:
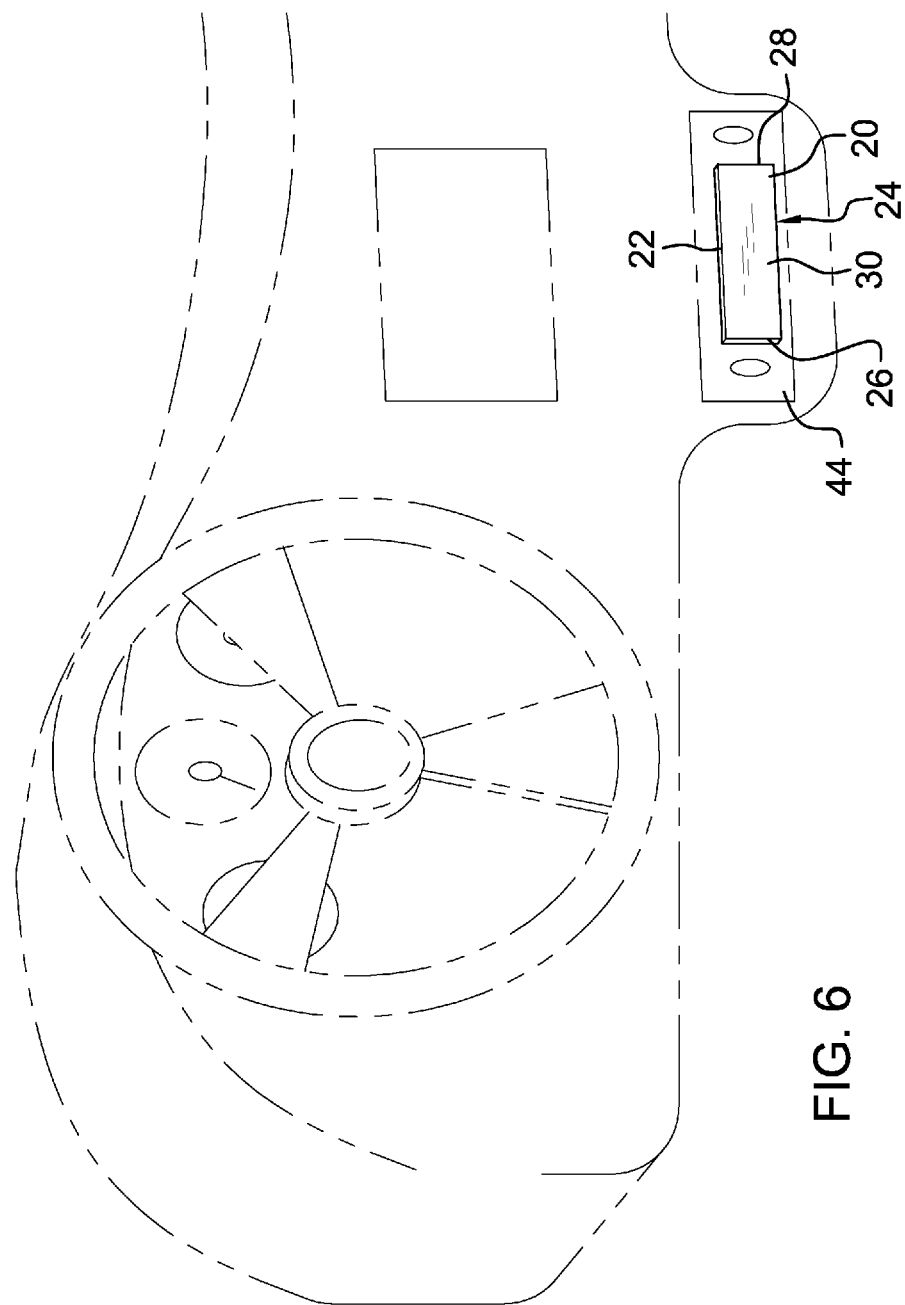

FIG. 1 is a rear view.
FIG. 2 is a front view.
FIG. 3 is a side view.
FIG. 4 is a top view.
FIG. 5 is an isometric view.
FIG. 6 is an in-use view showing the device installed in a vehicle CD player.

DETAILED DESCRIPTION OF THE DRAWINGS

With reference now to the drawings, and in particular FIGS. 1 through 6 thereof, example of the instant vehicle CD player plug-cover employing the principles and concepts of the present vehicle CD player plug-cover and generally designated by the reference number 10 will be described.

Referring to FIGS. 1 through 6 a preferred embodiment of the present vehicle CD player plug-cover 10 is illustrated.

The vehicle CD player plug-cover 10 includes a parallelepiped cover 20 having a first long edge 22, a second long edge 24 disposed parallel the first long edge 22, a first short edge 26 disposed perpendicular the first 22 and second 24 long edges, a second short edge 28 disposed parallel the first short edge 26, a front surface 30, and a rear surface 32.

A parallelepiped insert 34 is centrally disposed upon the rear surface 32. The insert 34 is disposed perpendicularly with respect to the cover, and projects therefrom. A first side edge 36 is disposed perpendicular the cover 20 and a second side edge 38 is disposed parallel the first side edge 36. A rear edge 40 is disposed parallel the cover 20. A bead 42 is disposed upon the rear edge 40. The bead 42 has a length equal to the diameter of a CD (see FIG. 4 and FIG. 5).

The insert 34 is configured to be insertable into an automobile CD player 44 and secured therein by means of the extant mechanism within the CD player. The cover 20 is configured to be longer than the insert 34, and the first 22 and second 24 long edges are longer in length than the insert 34 rear edge 40. The cover 20 is thereby held in front of said CD player 44 when the insert 34 is inserted into the CD player 44. When the insert 34 is inserted into an automobile CD player 44, the cover 20 conceals the CD player from view (see FIG. 6).

The present vehicle CD player plug-cover 10 therefore protects an extant automobile CD player 44 from dust and debris, and other damage that may be rendered the CD player 44 when uncovered, and further decreases the possibility of thievery.

What is claimed is:

1. A vehicle CD player plug-cover comprising:
   a parallelepiped cover comprising:
   - a first long edge;
   - a second long edge disposed parallel the first long edge;
   - a first short edge disposed perpendicular the first and second long edges;
   - a second short edge disposed parallel the first short edge;
   - a front surface;
   - a rear surface;

a parallelepiped insert centrally disposed upon the rear surface, the insert disposed perpendicularly with respect to the cover and projecting therefrom, the insert comprising:
   - a first side edge disposed perpendicular the cover;
   - a second side edge disposed parallel the first side edge;
   - a rear edge disposed parallel the rear surface of the cover;
   - a bead disposed lengthwise upon the rear edge;

wherein the insert is configured to be releasably insertable into an automobile CD player whereby the cover is removably held in front of said CD player.

2. The vehicle CD player plug-cover of claim 1 wherein the front surface overlies the automobile CD player when inserted into said CD player.

3. The vehicle CD player plug-cover of claim 2 wherein the bead has a length equal to the diameter of a CD.

* * * * *